(12) United States Patent (10) Patent No.: US 8,226,532 B2
Okumoto et al. (45) Date of Patent: Jul. 24, 2012

(54) CONTROL APPARATUS FOR AUTOMATIC TRANSMISSION, AND CONTROL METHOD FOR AUTOMATIC TRANSMISSION

(75) Inventors: Gen Okumoto, Anjo (JP); Yasuo Tsukamoto, Ohbu (JP); Hideki Tomida, Nishio (JP); Masahiko Nishikawa, Okazaki (JP)

(73) Assignee: Aisin AW Co., Ltd., Aichi-Ken (JP)

( * ) Notice: Subject to any disclaimer, the term of this patent is extended or adjusted under 35 U.S.C. 154(b) by 543 days.

(21) Appl. No.: 12/550,134

(22) Filed: Aug. 28, 2009

(65) Prior Publication Data

US 2010/0056333 A1 Mar. 4, 2010

(30) Foreign Application Priority Data

Aug. 29, 2008 (JP) ................................. 2008-222333

(51) Int. Cl.
*F16H 61/00* (2006.01)
(52) U.S. Cl. .................... 477/117; 477/166; 477/180
(58) Field of Classification Search .............. 477/76, 477/70, 97, 98, 116, 117, 166, 168, 169, 477/174, 180
See application file for complete search history.

(56) References Cited

U.S. PATENT DOCUMENTS

| | | | |
|---|---|---|---|
| 5,741,201 A * | 4/1998 | Tsutsui et al. | 477/116 |
| 2003/0045988 A1 | 3/2003 | Suzuki et al. | |
| 2005/0021208 A1 | 1/2005 | Nagai et al. | |
| 2005/0222734 A1 | 10/2005 | Akaike | |
| 2006/0293146 A1 | 12/2006 | Nakayashiki et al. | |
| 2008/0020896 A1 | 1/2008 | Kamishima | |
| 2008/0058156 A1 | 3/2008 | Kakisaka et al. | |

FOREIGN PATENT DOCUMENTS

| | | |
|---|---|---|
| EP | 0 681 123 A2 | 11/1995 |
| EP | 0 742 391 A1 | 11/1996 |
| EP | 1 857 715 A1 | 11/2007 |
| JP | 11-230330 A | 8/1999 |
| JP | 2001-165289 A | 6/2001 |
| JP | 2003-074688 A | 3/2003 |
| JP | 2003-165360 A | 6/2003 |
| JP | 2004-116686 A | 4/2004 |
| JP | 2004-162845 A | 6/2004 |
| JP | 2005-282798 A | 10/2005 |

OTHER PUBLICATIONS

European Search Report dated Dec. 23, 2011 issued in corresponding European Patent Application No. 09809720.7.

\* cited by examiner

*Primary Examiner* — Justin Holmes
(74) *Attorney, Agent, or Firm* — Sughrue Mion, PLLC (57) ABSTRACT

A control apparatus for an automatic transmission having a rotation transmission mechanism for transmitting rotation of a prime mover mounted on a vehicle to a speed change mechanism, and an input clutch for controlling connection/disconnection of the transmitted rotation. The control apparatus includes a control portion that performs a neutral control including a release control that reduces rotation transmission efficiency, and an in-neutral control so as to maintain rotation efficiency. During the in-neutral control, a check control is performed that makes the fluid pressure relative to the input clutch fluctuate, and when determining as a result of the check control that the rotation transmission efficiency is in a predetermined low efficiency state, then reducing the fluid pressure relative to the input clutch by a set pressure, and thereafter maintaining the fluid pressure constant.

5 Claims, 7 Drawing Sheets

| | FIRST HYDRAULIC OIL PRESSURE Pc1 IMMEDIATELY BEFORE START OF RELEASE CONTROL | KPc11 | KPc12 | KPc13 | KPc14 |
|---|---|---|---|---|---|
| OIL TEMPERATURE Tf | Tf < KT1 | Poff11 | Poff21 | Poff31 | Poff41 |
| | KT1 ≤ Tf ≤ KT2 | Poff12 | Poff22 | Poff32 | Poff42 |
| | KT2 < Tf | Poff13 | Poff23 | Poff33 | Poff43 |

CONTROL APPARATUS FOR AUTOMATIC TRANSMISSION, AND CONTROL METHOD FOR AUTOMATIC TRANSMISSION

INCORPORATION BY REFERENCE

The disclosure of Japanese Patent Application No. 2008-222333 filed on Aug. 29, 2008 including the specification, drawings and abstract is incorporated herein by reference in its entirety.

BACKGROUND OF THE INVENTION

The present invention relates to a control apparatus for an automatic transmission and a control method for an automatic transmission.

DESCRIPTION OF THE RELATED ART

A vehicle is generally mounted with an automatic transmission that transmits the rotation of an engine as a prime mover. Such an automatic transmission includes a torque converter and a speed change mechanism that serve as rotation transmission mechanisms. The speed change mechanism includes an input clutch for controlling to connect and disconnect the rotation transmitted via the torque converter from the engine. This input clutch is designed to be brought into an engaged state when the automatic transmission is in a forward driving range (hereinafter referred to as "D range"), and brought into a released state when the automatic transmission is in a neutral range (hereinafter referred as to "N range").

Therefore, if the automatic transmission is in the D range when the vehicle is stationary, the input clutch is in an engaged state and the load generated by the torque converter becomes larger than that in the case where the automatic transmission is in the N range. This, as a result, invites an aggravated fuel efficiency of the vehicle. Thus, recently, as a device for achieving improvement of fuel consumption of the vehicle, a control apparatus for an automatic transmission as described in, for example, Japanese Patent Application Publication No. JP-A-2001-165289 is proposed.

Such a control apparatus is designed to perform, when determining that the vehicle is stationary, a neutral control that reduces rotation transmission efficiency from the torque converter side to the speed change mechanism side by way of the input clutch. The neutral control reduces the hydraulic pressure relative to the input clutch to thereby minimize as much as possible an engagement force of an output side member relative to an input side member of the input clutch. Note that the condition in which the engagement force of the output side member relative to the input side member of the input clutch is substantially "0 (zero)" is referred to as "the input clutch being in a stroke-end condition".

That is, the abovementioned control apparatus performs an in-neutral control after executing a release control that reduces the hydraulic pressure relative to the input clutch such that the rotation transmission efficiency via the input clutch is reduced to a predetermined efficiency. During this in-neutral control, while performing a check control to microscopically change the hydraulic pressure relative to the input clutch, the control apparatus detects the amount of fluctuation in the rotation speed of an input shaft of the speed change mechanism (that is, the rotation speed of the input side member of the input clutch) in order to check the rotation transmission efficiency. If the amount of fluctuation in the rotation speed of the input shaft is equal to, or lower than, a predetermined rotation speed threshold value, the control apparatus determines that the input clutch is in a condition close to the stroke-end condition and keeps the hydraulic pressure relative to the input clutch constant. Accordingly, the neutral control is performed to keep the rotation transmission efficiency via the input clutch low when the vehicle is stationary, which results in reduced load generated in the torque converter. Consequently, the fuel efficiency of the vehicle is improved.

SUMMARY OF THE INVENTION

It is to be noted here that the check control performed at the start of the in-neutral control uses an action that the smaller the engagement force of the output side member relative to the input side member of the input clutch, the more the rotation transmission efficiency via the input clutch is reduced, resulting in a smaller amount of fluctuation in the speed of the input shaft based on the abovementioned microscopic fluctuation in the hydraulic pressure. Even if the check control is performed when the input clutch is in the stroke-end condition, it is likely that the amount of fluctuation in the speed of the input shaft based on the check control will not be detected because of the low hydraulic pressure level relative to the input clutch. That is, the check control can be performed only when the hydraulic pressure level is such that the amount of fluctuation in the speed of the input shaft is detectable as a result of the check control. In the related-art neutral control, therefore, the input clutch cannot be brought near to an extremity of the stroke-end condition, so that there is room for improvement in fuel efficiency of the vehicle.

It is an object of the present invention to provide a control apparatus for an automatic transmission and a control method for an automatic transmission that can contribute to improved fuel efficiency of the vehicle in the neutral control when the vehicle is stationary.

To achieve the foregoing object, a control apparatus for an automatic transmission according a first aspect of the present invention is a control apparatus for an automatic transmission that has a rotation transmission mechanism for transmitting rotation of a prime mover mounted on a vehicle to a speed change mechanism and an input clutch for controlling connection and disconnection of the rotation transmitted from the rotation transmission mechanism. The control apparatus includes a control portion performing a neutral control that includes a release control that reduces a fluid pressure relative to the input clutch so as to reduce rotation transmission efficiency from the rotation transmission mechanism side to the speed change mechanism side via the input clutch when the vehicle is stationary, and an in-neutral control that adjusts the fluid pressure relative to the input clutch so as to maintain the rotation transmission efficiency via the input clutch at a low efficiency. The control portion performs, during the in-neutral control, a check control that makes the fluid pressure relative to the input clutch fluctuate and, when determining as a result of the check control, that the rotation transmission efficiency via the input clutch is in a predetermined state set previously as a low efficiency, reduces the fluid pressure relative to the input clutch at termination of the check control by a set pressure, and thereafter keeps the fluid pressure constant.

In accordance with the foregoing configuration, if the check control determines that the rotation transmission efficiency via the input clutch is in the predetermined state set previously as a low efficiency, the fluid pressure relative to the input clutch at the termination of the check control is reduced by the set pressure and thereafter held constant. Load on the rotation transmission mechanism during the neutral control therefore becomes smaller than that of the related-art configuration in which the fluid pressure relative to the input clutch is held at the fluid pressure relative to the input clutch at the termination of the check control. As a result, the prime mover rotatably drives in a condition of a low load being applied to the prime mover when the vehicle is stationary. This contributes to an improved fuel efficiency of the vehicle during the neutral control when the vehicle is stationary.

According to the first aspect of the present invention, the control apparatus may further include a speed detection portion that detects an input side speed of the input clutch. The control portion may cause, in the check control, the fluid pressure relative to the input clutch to fluctuate within a predetermined pressure range that is previously set and, when an amount of fluctuation of the input side speed of the input clutch detected by the speed detection portion during the check control is equal to or less than a previously set speed threshold value, determine that the rotation transmission efficiency via the input clutch is in the predetermined state.

In accordance with the foregoing configuration, in the check control, the fluid pressure relative to the input clutch is made to fluctuate within a predetermined pressure range and the amount of fluctuation of the input side speed of the input clutch based on the fluctuation of the fluid pressure is detected. If the detected result is equal to or less than the speed threshold value, the rotation transmission efficiency via the input clutch is determined to be in the predetermined state. That is, the check control of the present invention uses an action that the smaller an engagement force of an output side member relative to an input side member of the input clutch, the more the rotation transmission efficiency via the input clutch is reduced, resulting in a smaller amount of fluctuation in the input side speed in accordance with the fluctuation of the fluid pressure. Accordingly, a positional relationship between the input side member and the output side member of the input clutch during the in-neutral control can be suitably adjusted.

According to the first aspect of the present invention, the control apparatus may further include a temperature detection portion that detects a temperature of a fluid for generating a fluid pressure relative to the input clutch and a first setting portion that sets a smaller value for the set pressure at a lower temperature of the fluid detected by the temperature detection portion. During the in-neutral control, when determining as a result of the check control, that the rotation transmission efficiency via the input clutch is in the predetermined state, the control portion may reduce the fluid pressure relative to the input clutch at the termination of the check control by the set pressure set by the first setting portion, and thereafter keep the fluid pressure constant.

Generally, fluids have a higher viscosity at lower fluid temperatures. Specifically, the lower the fluid temperature, the slower the speed at which the fluid pressure relative to the input clutch fluctuate in response to a control command from the control portion or the like. In the present invention, therefore, the set pressure is set to a smaller value at lower fluid temperatures. Therefore, after the termination of the check control, an actually measured fluid pressure relative to the input clutch (hereinafter referred to as an "actual fluid pressure") can be quickly held constant regardless of the fluid temperature. Moreover, at the termination of the neutral control, the actual fluid pressure relative to the input clutch can be quickly boosted to a pressure that brings the input clutch into the engaged state regardless of the fluid temperature. This contributes to quick starts of the vehicle.

According to the first aspect of the present invention, the control apparatus may further include a fluid pressure detection portion that detects the fluid pressure relative to the input clutch and a second setting portion that sets a smaller value for the set pressure at a lower fluid pressure detected by the fluid pressure detection portion before the release control. During the in-neutral control, when determining as a result of the check control that, the rotation transmission efficiency via the input clutch is in the predetermined state, the control portion may reduce the fluid pressure relative to the input clutch at the termination of the check control by the set pressure set by the second setting portion, and thereafter keep the fluid pressure constant.

Generally speaking, a trend is noted in which the lower the fluid pressure relative to the input clutch before the neutral control, the greater a difference between the actual fluid pressure relative to the input clutch and a control command value set by the control portion or the like. Specifically, a trend can be noted in which the actual fluid pressure becomes lower than the fluid pressure based on the control command value. In the present invention, therefore, the set pressure is set to a smaller value at lower fluid pressures relative to the input clutch before the neutral control. Accordingly, the magnitude of the actual fluid pressure relative to the input clutch when the fluid pressure relative to the input clutch is held constant is inhibited from changing due to the magnitude of the actual fluid pressure relative to the input clutch before the neutral control. Accordingly, fuel efficiency improvement effect based on the performance of the neutral control of the present invention can be inhibited from changing due to the magnitude of the fluid pressure relative to the input clutch before the neutral control. In addition, upon termination of the neutral control, the actual fluid pressure relative to the input clutch can be quickly boosted to a pressure level that brings the input clutch into an engaged state regardless of the magnitude of the fluid pressure relative to the input clutch before the neutral control. That is, this contributes to quick starts of the vehicle.

To achieve the foregoing object, a control method for an automatic transmission according to a second aspect of the present invention is for an automatic transmission that has a rotation transmission mechanism for transmitting rotation of a prime mover mounted on a vehicle to a speed change mechanism and an input clutch for controlling connection and disconnection of the rotation transmitted from the rotation transmission mechanism. The control method includes a release step of reducing a fluid pressure relative to the input clutch such that the rotation transmission efficiency via the input clutch is reduced, when a start condition is met for a neutral control that reduces the rotation transmission efficiency from the rotation transmission mechanism side to the speed change mechanism side via the input clutch as compared with the efficiency during vehicle running while the vehicle is stationary, and an in-neutral step of maintaining the rotation transmission efficiency via the input clutch low after the release step. The in-neutral step includes the steps of: performing a check control that causes the fluid pressure relative to the input clutch to fluctuate; reducing, when it is determined as a result of the check control, that the rotation transmission efficiency via the input clutch is in a predetermined state set previously as a low efficiency, the fluid pressure relative to the input clutch at termination of the check control by a set pressure; and keeping, after the reduction in the fluid pressure, the fluid pressure relative to the input clutch constant.

With the foregoing configuration, it is possible to obtain advantages equivalent to those of the first aspect of the present invention.

DETAILED DESCRIPTION OF THE EMBODIMENTS

One embodiment in which the present invention is embodied in a control apparatus of an automatic transmission and a control method of an automatic transmission mounted on a vehicle will be described in accordance with FIGS. 1 to 9.

Figure 1:
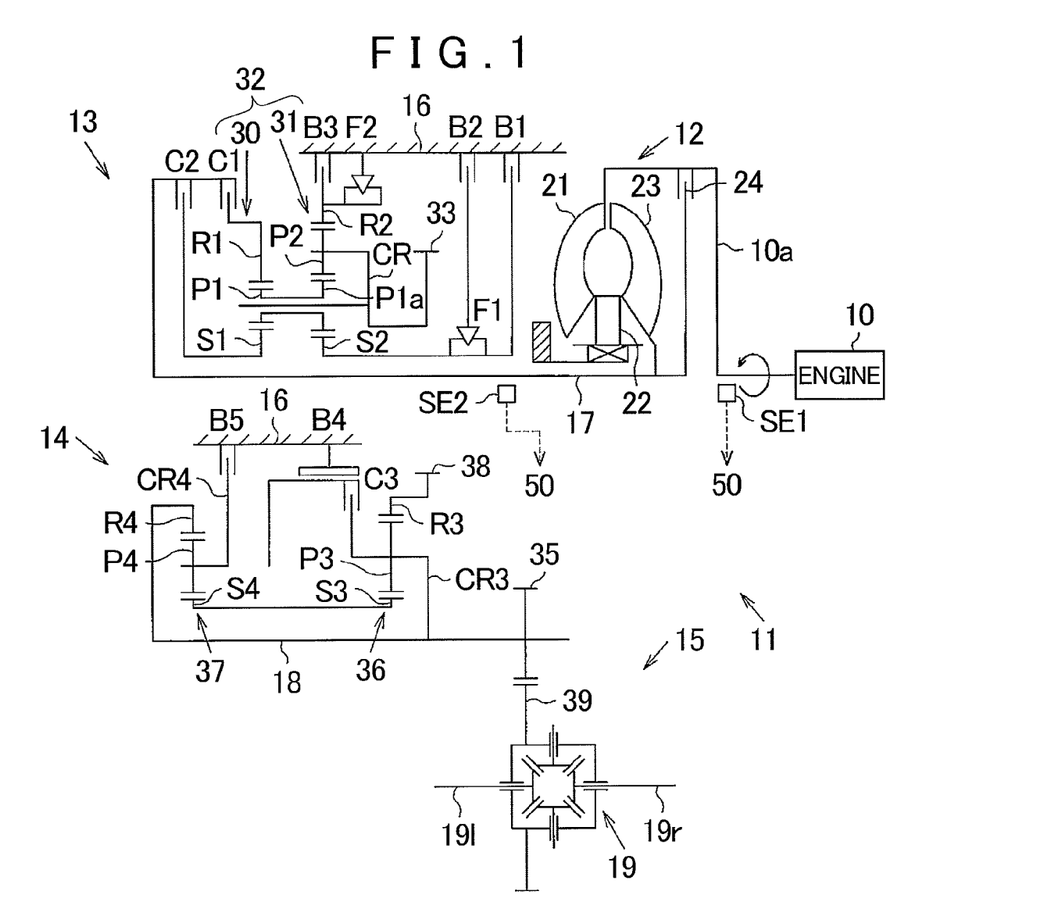
FIG. 1 is a skeleton diagram showing an automatic transmission according to an embodiment of the present invention.

Referring to FIG. 1, an automatic transmission 11 according to this embodiment is an automatic transmission having five forward speeds and one reverse speed. This automatic transmission 11 includes a torque converter 12, a three-speed main speed change mechanism 13, a three-speed auxiliary speed change mechanism 14, and a differential mechanism 15, as rotation transmission mechanisms that are arranged in sequence from the side of an engine (prime mover) 10 that is an upstream side in the direction of power transmission toward the side of a driving wheel that is a downstream side. These mechanisms 12 through 15 are housed in a transmission case 16. A first shaft (hereinafter referred to as an "input shaft") 17 that is arranged in alignment with a crankshaft 10a extending from the side of the engine 10, and a second shaft (hereinafter referred to as a "counter shaft") 18, and a third shaft 19 (axles of right and left front wheels, which are referred to as "left and right front axles 19l and 19r"), which are in parallel with the input shaft 17, are supported rotatably within the transmission case 16.

A pump impeller 21, a stator 22, and a turbine 23 that are connected to the crankshaft 10a are provided in the torque converter 12. When the pump impeller 21 rotates based on the rotation of the engine 10 (crankshaft 10a), the rotation is transmitted to the turbine 23 via a hydraulic oil that serves as a fluid within the torque converter 12. Thus, the rotation of the engine 10 is transmitted to the three-speed main speed change mechanism 13. Further, a lock-up clutch 24 is provided in the torque converter 12. When the lock-up clutch 24 is engaged, the pump impeller 21 and the turbine 23 are mechanically connected to each other via the lock-up clutch 24. Accordingly, the rotation of the engine 10 is directly transmitted to the three-speed main speed change mechanism 13 without involving the hydraulic oil.

The three-speed main speed change mechanism 13 includes a planetary gear unit 32 having a simple planetary gear 30 and a double pinion planetary gear 31. The simple planetary gear 30 is structured to include a sun gear S1, a ring gear R1, and a common carrier CR that supports a pinion P1 meshing with the gears S1 and R1. The double pinion planetary gear 31, on the other hand, is structured to include a sun gear S2, a ring gear R2, and the common carrier CR that is also a component of the simple planetary gear 30. The common carrier CR supports a pinion P1a that meshes with the sun gear S2, and a pinion P2 that meshes with the ring gear R2, in a state in which the pinions P1a and P2 mesh with each other.

The input shaft 17 to which the rotation of the engine 10 is transmitted via the torque converter 12 can be connected, relative to the planetary gear unit 32, to the ring gear R1 of the simple planetary gear 30 via a first clutch C1 that serves as an input clutch, and to the sun gear S1 via a second clutch C2. In addition, the sun gear S2 of the double pinion planetary gear 31 can be locked directly by a first brake B1, and can be locked by a second brake B2 via a first one-way clutch F1. Further, the ring gear R2 of the double pinion planetary gear 31 can be locked by a third brake B3 and a second one-way clutch F2. The common carrier CR is connected to a counter drive gear 33 that is an output member of the three-speed main speed change mechanism 13.

The three-speed auxiliary speed change mechanism 14 includes a first simple planetary gear 36, a second simple planetary gear 37, and an output gear 35. These gears 35, 36, and 37 are arranged in sequence from one side (right-hand side in FIG. 1) in an axial direction of the counter shaft 18 toward the other side (left-hand side in FIG. 1). The first simple planetary gear 36 is structured to include a ring gear R3, a sun gear S3, and a pinion P3. A counter driven gear 38 that meshes with the counter drive gear 33 of the three-speed main speed change mechanism 13 is connected to the ring gear R3. Further, the sun gear S3 is rotatably supported by the counter shaft 18 and the pinion P3 is supported by a carrier CR3 formed of a flange integrally connected to the counter shaft 18. The carrier CR3 is connected to an inner hub of a UD direct clutch C3.

The second simple planetary gear 37 is structured to include a sun gear S4, a ring gear R4, and a pinion P4. The sun gear S4 is connected to the sun gear S3 of the first simple planetary gear 36 and the ring gear $\overline{R4}$ is connected to the counter shaft 18. The UD direct clutch C3 is disposed between the carrier CR3 of the first simple planetary gear 36 and each of the sun gears S3 and S4. Each of the sun gears S3 and S4 can be locked by a fourth brake B4 formed of a band brake. In addition, the pinion P4 is supported by the carrier CR4 and the carrier CR4 can be locked by a fifth brake B5.

Note that the above-described brakes B1 to B5, and the second one-way clutch F2 are attached to an inner surface of the transmission case 16.

The differential mechanism 15 includes a ring gear 39 that meshes with the output gear 35 of the three-speed auxiliary speed change mechanism 14. Rotation transmitted via the ring gear 39 from the side of the output gear 35 is branched to the left and right and transmitted to the left and right front axles 19l and 19r, respectively.

Figure 2:
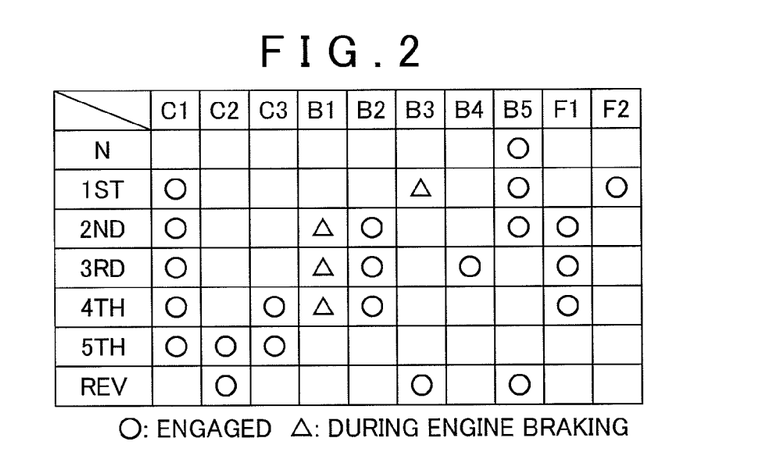
FIG. 2 is an operation table of respective clutches and respective brakes at respective shift speeds.

In the automatic transmission 11 configured as described above, the clutches C1 to C3, F1, F2 and the brakes B1 to B5 are selectively engaged or disengaged, and operated, as shown in FIG. 2, through a hydraulic control of a hydraulic control circuit 40 (see FIG. 3) that is to be described later. Specifically, in each range, the clutches and brake marked with "o" in the operation table of FIG. 2 are brought into an engaged state, and during engine braking, the brake marked with "Δ" in the operation table of FIG. 2 is brought into the engaged state. When the shift speed is a first speed (1ST) in a forward driving range (hereinafter referred to as a "D range"), for example, the first clutch C1, the fifth brake B5, and the second one-way clutch F2 are respectively brought into the engaged state. During engine braking at the first speed, the third brake B3 is brought into the engaged state. Note that descriptions for other shift speeds or a reverse driving range (hereinafter referred to as a "REV range") will be omitted.

The hydraulic control circuit 40 of the automatic transmission 11 will be described with reference to FIGS. 1 and 3. Note that FIG. 3 shows only a portion related to the engagement and disengagement of the first clutch C1.

Figure 3:
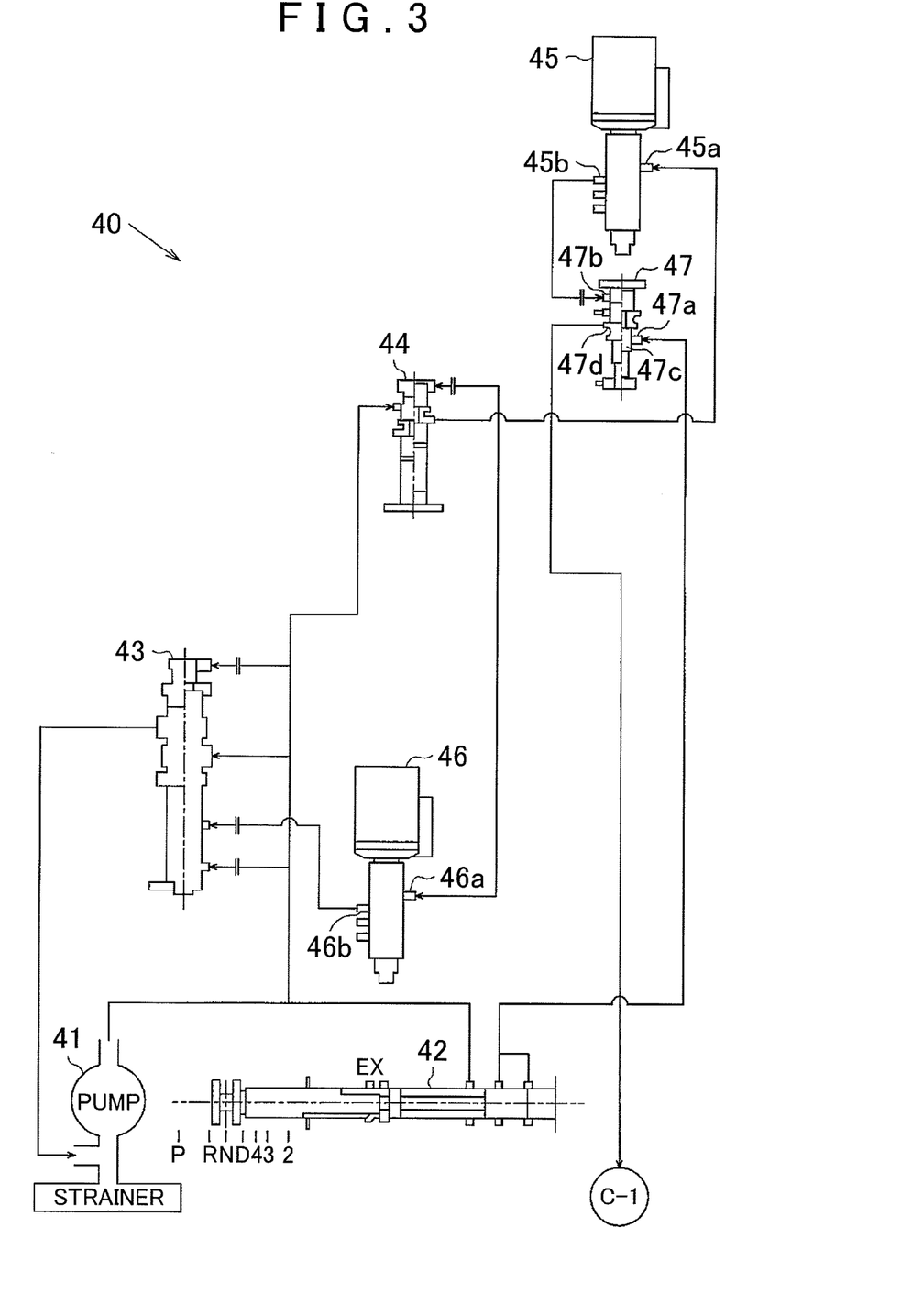
FIG. 3 is a schematic diagram showing a hydraulic control circuit of a portion related to engagement/disengagement control of a first clutch.

Referring to FIG. 3, the hydraulic control circuit 40 that serves as a pressure-regulating mechanism is formed inside a valve body (not shown) disposed downward of the automatic transmission 11. The hydraulic control circuit 40 is structured so as to be supplied with the hydraulic oil from an oil tank (not shown) based on a drive of an oil pump 41 driven through rotation of the pump impeller 21. The hydraulic control circuit 40 includes a manual valve 42, a primary regulator valve 43, and a modulator valve 44 that are connected to the oil pump 41. Linear solenoid valves 45 and 46 are connected to the modulator valve 44 and a control valve 47 is connected to the linear solenoid valve 45. A hydraulic servo C-1 for controlling the engagement and disengagement of the first clutch C1 is connected to the control valve 47.

The hydraulic oil pressure generated on the basis of the drive of the oil pump 41 is regulated to a line pressure by the primary regulator valve 43 and is then supplied to the manual valve 42 and the modulator valve 44, respectively. Then, in the modulator valve 44, the line pressure is reduced and the reduced line pressure is supplied to respective input ports 45a and 46a of the linear solenoid valves 45 and 46. In each of the linear solenoid valves 45 and 46 to which the line pressure has been supplied in this manner, a control oil pressure corresponding to an energization mode of the valve is generated. The control oil pressure generated by the linear solenoid valve 45 is outputted to the control valve 47 via an output port 45b and the control oil pressure generated by the linear solenoid valve 46 is outputted to the primary regulator valve 43 via an output port 46b.

Additionally, the line pressure is supplied to the control valve 47 via an input port 47a from the manual valve 42. The line pressure is regulated by a spool 47c that reciprocates based on the control oil pressure from the linear solenoid valve 45 inputted to a port 47b and is supplied to the hydraulic servo C-1 from a port 47d. Specifically, the engagement and disengagement of the clutch C1 is controlled by regulating the hydraulic oil pressure supplied to the hydraulic servo C-1 in response to the energization of the linear solenoid valve 45.

The hydraulic control circuit 40 according to this embodiment is structured such that an inflow portion of the hydraulic oil from the side of the oil tank has a size smaller than that of an outflow portion toward the hydraulic servo C-1. Accordingly, if a sufficient amount of hydraulic oil is stored in the hydraulic control circuit 40, the hydraulic oil pressure actually measured inside the hydraulic servo C-1 (hereinafter referred to as an "actual hydraulic oil pressure") is quickly regulated, following a control command value (also called a "first hydraulic oil pressure") based on the drive of the hydraulic control circuit 40. If there is only an insufficient amount of hydraulic oil stored in the hydraulic control circuit 40, on the other hand, the hydraulic control circuit 40 may only supply the hydraulic servo C-1 with the hydraulic oil in quantity less than the appropriate. The actual hydraulic oil pressure in the hydraulic servo C-1 is then likely to be lower than the control command value based on the drive of the hydraulic control circuit 40. Specifically, a trend is noted in which the smaller the hydraulic oil stored in the hydraulic control circuit 40, the greater the difference between the control command value and the actual hydraulic oil pressure.

Next, an electronic control unit (hereinafter referred to as an "ECU") serving as a control apparatus that controls the drive of the automatic transmission 11 will be described below with reference to FIG. 4.

Figure 4:
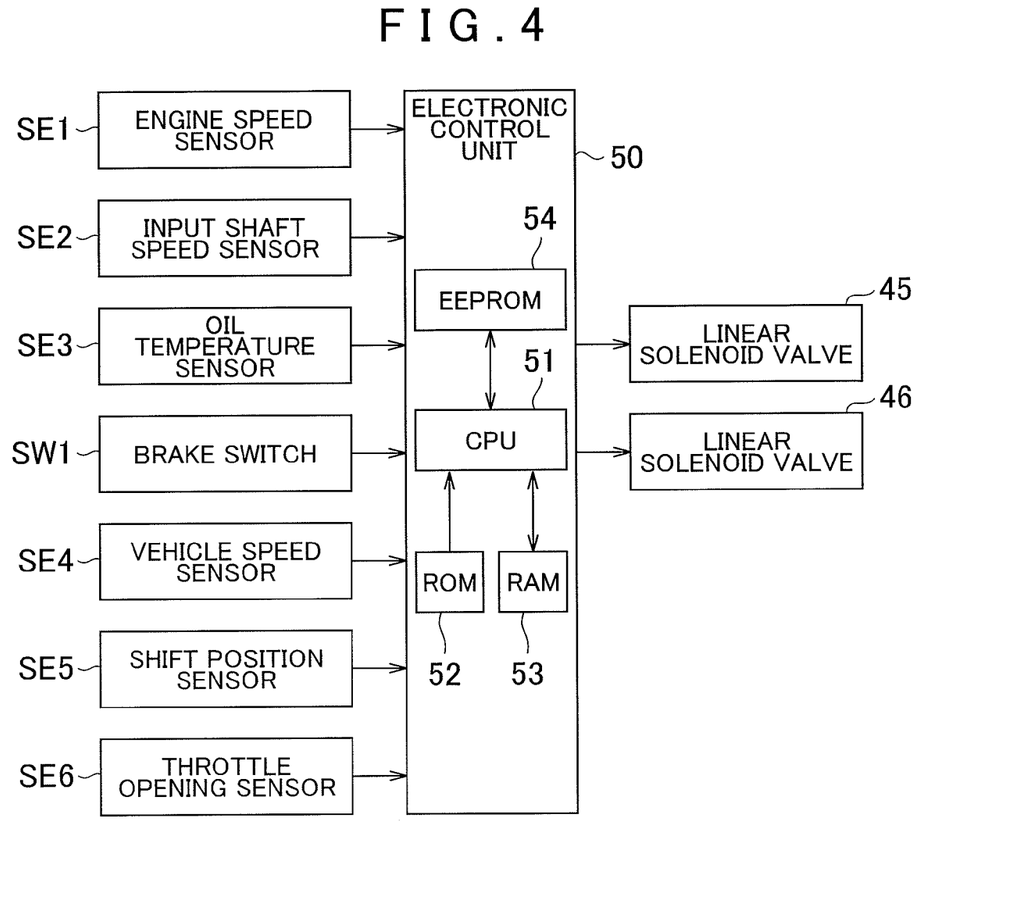
FIG. 4 is a block diagram showing an electric configuration.

Referring to FIG. 4, an ECU 50 mainly includes an input-side interface (not shown), an output-side interface (not shown), a digital computer having, for example, a CPU 51, ROM 52, RAM 53, and EEPROM (electronically erasable and programmable read only memory) 54, and a driving circuit that drives the mechanisms. An engine speed sensor SE1 for detecting a rotating speed of the engine 10 (crankshaft 10a) (hereinafter referred to as the "engine speed"), an input shaft speed sensor SE2 for detecting a rotating speed of the input shaft 17 (hereinafter referred to as the "input shaft speed"), and an oil temperature sensor SE3 for detecting an oil temperature (temperature) of the hydraulic oil supplied to the hydraulic servo C-1 are electrically connected to the input-side interface of the ECU 50. In addition, a brake switch SW1 that outputs an "ON" signal when a brake pedal (not shown) is depressed, a vehicle speed sensor SE4 for detecting a vehicle body speed of the vehicle (hereinafter referred to as the "vehicle speed"), a shift position sensor SE5 for detecting a shift range of the automatic transmission 11, and a throttle opening sensor SE6 for detecting a throttle opening of an accelerator pedal (not shown) are electrically connected to the input-side interface.

The linear solenoid valves 45 and 46 (i.e., the hydraulic control circuit 40) are electrically connected to the output-side interface of ECU 50. The ECU 50 controls the drive of the hydraulic control circuit 40 based on various types of detection signals from the various types of sensors SE1 to SE6 and the brake switch SW1.

n the digital computer, the ROM 52 stores therein various types of control programs for controlling the automatic transmission 11 via the hydraulic control circuit 40 (including neutral control processing to be described later), various types of maps (including the map shown in FIG. 5), and various types of threshold values (including a fluctuation amount threshold value described later), and the like. In addition, the RAM 53 stores therein various types of information (including the first hydraulic oil pressure, the oil temperature, the set pressure, the amount of fluctuation, and the amount of reduction in pressure, which are described later) that are rewritten as required while an ignition switch (not shown) of the vehicle is "ON". Further, the EEPROM 54 stores therein various types of information that should not be erased even when the ignition switch is turned "OFF".

The maps stored in the ROM 52 will next be described based on FIG. 5.

Figure 5:
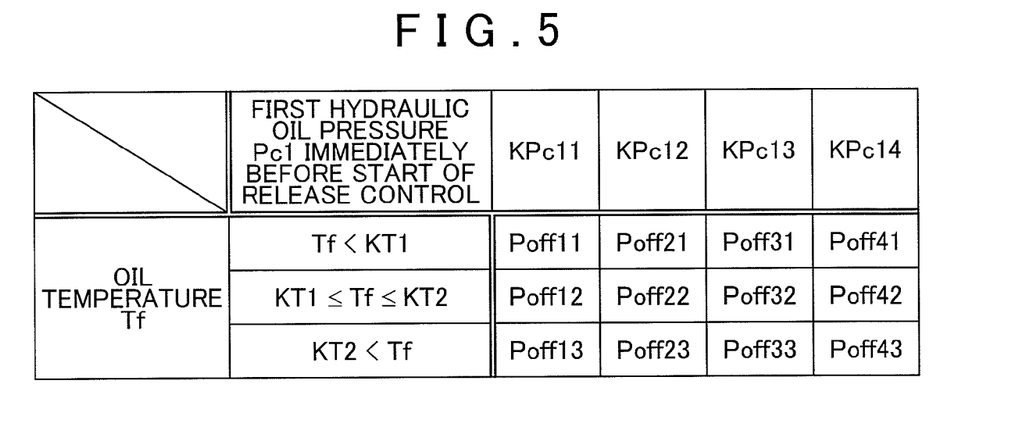
FIG. 5 is a map for setting a set pressure.

The map shown in FIG. 5 is used for setting a set pressure Poff (see FIG. 6) to be described later. Referring to FIG. 5, the set pressure Poff is set to a greater value as the first hydraulic oil pressure (a fluid pressure relative to the first clutch C1) Pc1, which is supplied to the hydraulic servo C-1 at a timing immediately before the start of a release control (described later), is higher. Also, the set pressure Poff is set to a greater value as the oil temperature Tf of the hydraulic oil supplied to the hydraulic servo C-1 is higher. That is, the set pressure Poff is set to a first set pressure Poff11 when the oil temperature Tf is lower than a first oil temperature threshold value KT1 and the first hydraulic oil pressure Pc1 is a first oil pressure threshold value KPc1. The set pressure Poff is set to a second set pressure Poff12 that is higher than the first set pressure Poff11 when the oil temperature Tf is equal to or higher than the first oil temperature threshold value KT1 and equal to or lower than a second oil temperature threshold value KT2 that is higher than the first oil temperature threshold value KT1 and when the first hydraulic oil pressure Pc1 is the first oil pressure threshold value KPc11. Further, the set pressure Poff is set to a third set pressure Poff13 that is higher than the second set pressure Poff12 when the oil temperature Tf is higher than the second oil temperature threshold value KT2 and the first hydraulic oil pressure Pc1 is the first oil pressure threshold value KPc1.

The set pressure Poff is set to a fourth set pressure Poff21 that is equivalent to the first set pressure Poff11 when the oil temperature Tf is lower than the first oil temperature threshold value KT1 and the first hydraulic oil pressure Pc1 is a second oil pressure threshold value KPc12 that is higher than the first oil pressure threshold value KPc11. The set pressure Poff is set to a fifth set pressure Poff22 that is equivalent to the second set pressure Poff12 when the oil temperature Tf is equal to or higher than the first oil temperature threshold value KT1 and equal to or lower than the second oil temperature threshold value KT2, and the first hydraulic oil pressure Pc1 is the second oil pressure threshold value KPc12. Further, the set pressure Poff is set to a sixth set pressure Poff23 that is equivalent to the third set pressure Poff13 when the oil temperature Tf is higher than the second oil temperature threshold value KT2 and the first hydraulic oil pressure Pc1 is the second oil pressure threshold value KPc12.

The set pressure Poff is set to a seventh set pressure Poff31 that is higher than the fourth set pressure Poff21 when the oil temperature Tf is lower than the first oil temperature threshold value KT1 and the first hydraulic oil pressure Pc1 is a third oil pressure threshold value KPc13 that is higher than the second oil pressure threshold value KPc11. The set pressure Poff is set to an eighth set pressure Poff32 that is higher than the fifth set pressure Poff22 when the oil temperature Tf is equal to or higher than the first oil temperature threshold value KT1 and equal to or lower than the second oil temperature threshold value KT2, and the first hydraulic oil pressure Pc1 is the third oil pressure threshold value KPc13. Further, the set pressure Poff is set to a ninth set pressure Poff33 that is higher than the sixth set pressure Poff23 when the oil temperature Tf is higher than the second oil temperature threshold value KT2 and the first hydraulic oil pressure Pc1 is the third oil pressure threshold value KPc13.

The set pressure Poff is set to a tenth set pressure Poff41 that is higher than the seventh set pressure Poff31 when the oil temperature Tf is lower than the first oil temperature threshold value KT1 and the first hydraulic oil pressure Pc1 is a fourth oil pressure threshold value KPc14 that is higher than the third oil pressure threshold value KPc13. The set pressure Poff is set to an eleventh set pressure Poff42 that is higher than the eighth set pressure Poff32 when the oil temperature Tf is equal to or higher than the first oil temperature threshold value KT1 and equal to or lower than the second oil temperature threshold value KT2, and the first hydraulic oil pressure Pc1 is the fourth oil pressure threshold value KPc14. Further, the set pressure Poff is set to a twelfth set pressure Poff43 that is higher than the ninth set pressure Poff33 when the oil temperature Tf is higher than the second oil temperature threshold value KT2 and the first hydraulic oil pressure Pc1 is the fourth oil pressure threshold value KPc14.

Figure 8:
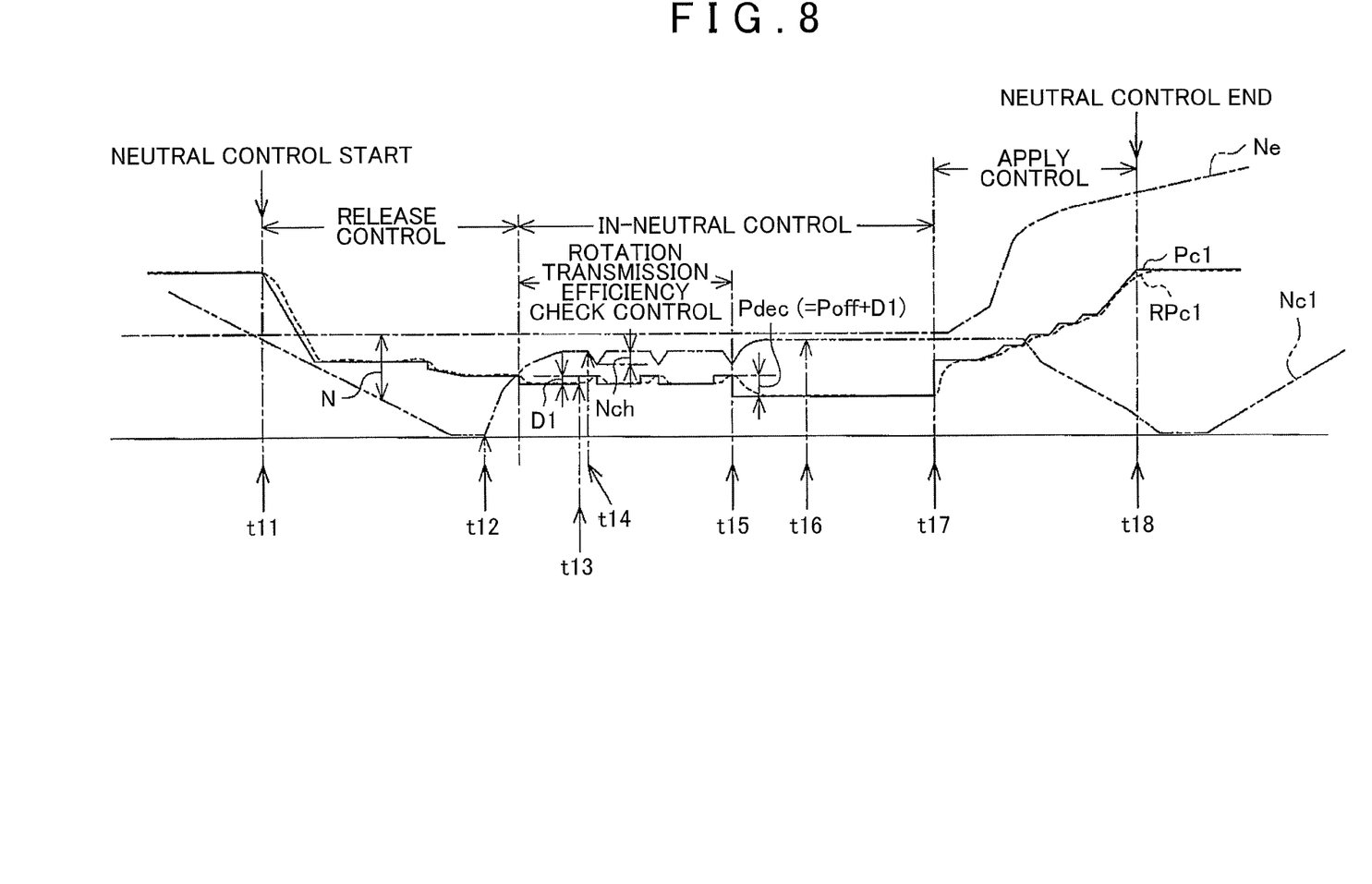
FIG. 8 is a timing chart showing the timing at which a first hydraulic oil pressure, an actual hydraulic oil pressure, and an input shaft speed change in a running N control.
Figure 9:
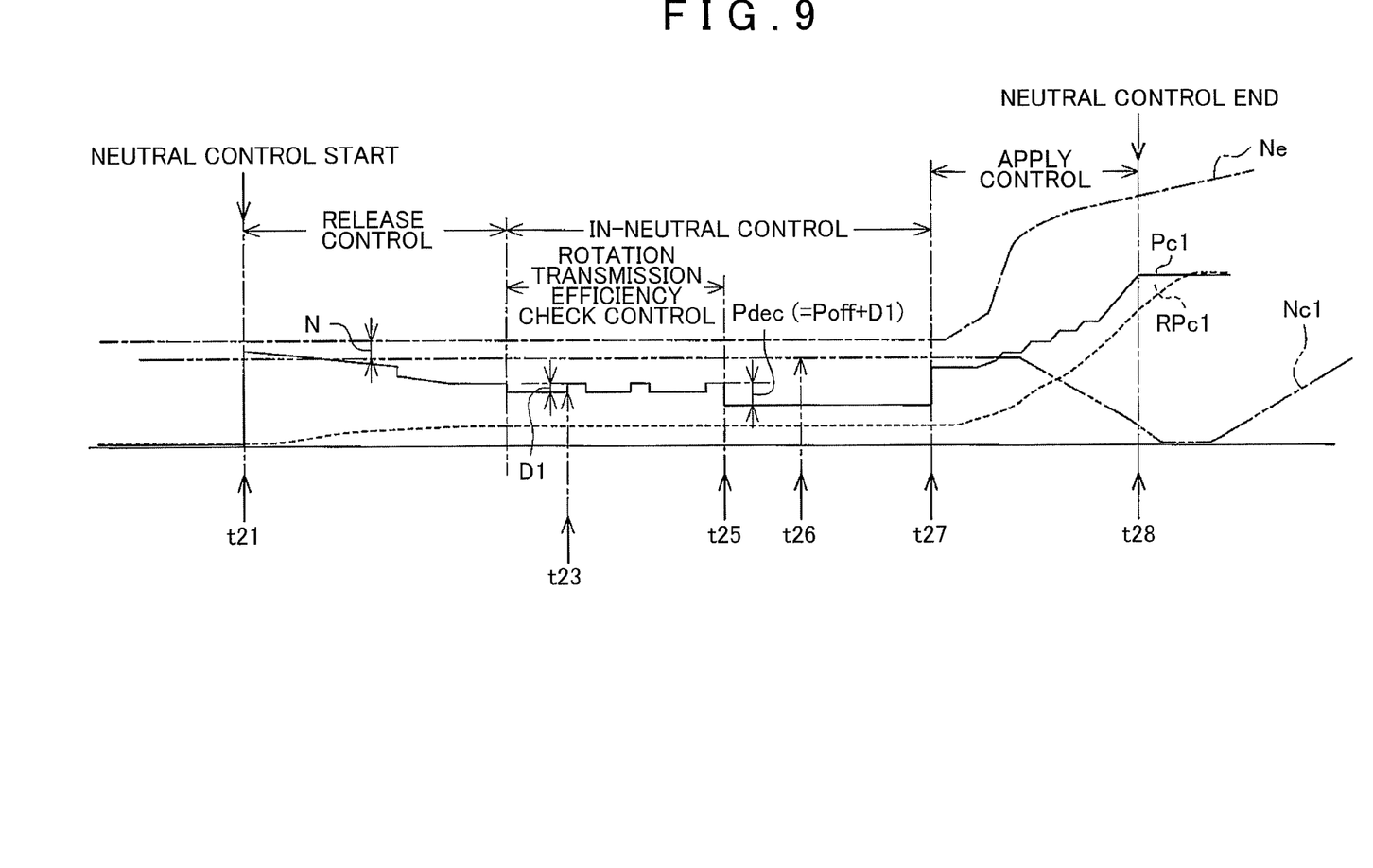
FIG. 9 is a timing chart showing the timing at which the first hydraulic oil pressure, the actual hydraulic oil pressure, and the input speed change in a direct N control.

A neutral control processing routine among other control processing routines executed by the ECU 50 of this embodiment will next be described based on a flow chart shown in FIG. 6 and timing charts shown in FIGS. 8 and 9. Note that the neutral control refers to a control performed to improve fuel efficiency of the vehicle by reducing the rotation transmission efficiency from the side of the torque converter 12 to the side of the three-speed main speed change mechanism 13 via the first clutch C1 as compared with timing during vehicle running. Further, the timing chart shown in FIG. 8 represents that the neutral control is performed when the vehicle running with the automatic transmission 11 in the D range is stopped at a red light or the like (hereinafter referred to as the "running N control"). The timing chart shown in FIG. 9 represents, on the other hand, that the neutral control is performed when the vehicle has not run at all after the ignition switch (not shown) of the vehicle has been turned "ON" (hereinafter referred to as the "direct N control").

The ECU 50 executes the neutral control processing routine at predetermined intervals while the ignition switch (not shown) of the vehicle is "ON". In this neutral control processing routine, the ECU 50 determines whether or not neutral control start conditions are met (step S10). Specifically, the ECU 50 detects the vehicle speed based on the detection signal from the vehicle speed sensor SE4 and the throttle opening of the accelerator pedal based on the detection signal from the throttle opening sensor SE6. The ECU 50 then determines whether or not all of the following conditions are met: the range of the automatic transmission 11 is the D range based on the detection signal from the shift position sensor SE5, the brake switch SW1 is "ON", the vehicle speed is substantially "0 (zero) km/h", and the throttle opening of the accelerator pedal is "0 (zero)". If the determination result is negative at step S10, the ECU 50 terminates the neutral control processing routine, because at least one of the abovementioned four conditions is not met.

If the determination result is affirmative at step S10, on the other hand, the ECU 50 determines that the neutral control start conditions are met and detects the hydraulic oil pressure supplied to the hydraulic servo C-1 based on the drive of the hydraulic control circuit 40 as the first hydraulic oil pressure (the fluid pressure relative to the input clutch) Pc1 (step 11). This first hydraulic oil pressure Pc1 is the control command value regulated by the hydraulic control circuit 40. Such a control command value can be calculated by inserting parameters and the like based on the drive of the hydraulic control circuit 40 into an arithmetic expression, without providing a sensor for detecting the actual hydraulic oil pressure in the hydraulic servo C-1. In this embodiment, therefore, the ECU 50 functions also as a fluid pressure detection portion.

The ECU 50 next detects the oil temperature Tf of the hydraulic oil supplied to the hydraulic servo C-1 based on the detection signal from the oil temperature sensor SE3 (step S12). In this embodiment, therefore, the ECU 50 functions also as a temperature detection portion. The ECU 50 then sets the set pressure Poff by inserting the first hydraulic oil pressure Pc1 and the oil temperature Tf detected in steps S11 and S12, respectively, in the map shown in FIG. 5 (step S13). If, for example, the oil temperature Tf is a predetermined temperature that is higher than the first oil temperature threshold value KT1 and lower than the second oil temperature threshold value KT2 and the first hydraulic oil pressure Pc1 is the third oil pressure threshold value KPc13, the set pressure Poff is set to the eighth set pressure Poff32 with reference to the map of FIG. 5. Alternatively, if the oil temperature Tf is the above-mentioned predetermined temperature and the first hydraulic oil pressure Pc1 is a predetermined oil pressure that is higher than the second oil pressure threshold value KPc12 and lower than the third oil pressure threshold value KPc13, the set pressure Poff is set to an oil pressure that is greater than the fifth set pressure Poff22 and smaller than the eighth set pressure Poff32. That is, in this embodiment, the set pressure Poff is linearly interpolated between the oil pressure threshold values KPc11 and KPc14. In this embodiment, therefore, the ECU 50 also functions as a first setting portion that sets the set pressure Poff based on the oil temperature Tf and as a second setting portion that sets the set pressure Poff based on the first hydraulic oil pressure Pc1.

Note here that, referring to the timing charts shown in FIGS. 8 and 9, at first timings t11, t21 immediately before the execution of the release control to be described later, the first hydraulic oil pressure Pc1 is detected and the oil temperature Tf of the hydraulic oil supplied to the hydraulic servo C-1 is also detected. Further, in this embodiment, the set pressure Poff is set at the first timings t11, t21. Note that the first hydraulic oil pressure Pc1 immediately before the start of the direct N control, at which an engine speed Ne of the engine 10 is yet to be high, is lower than the first hydraulic oil pressure Pc1 immediately before the start of the running N control.

Figure 6:
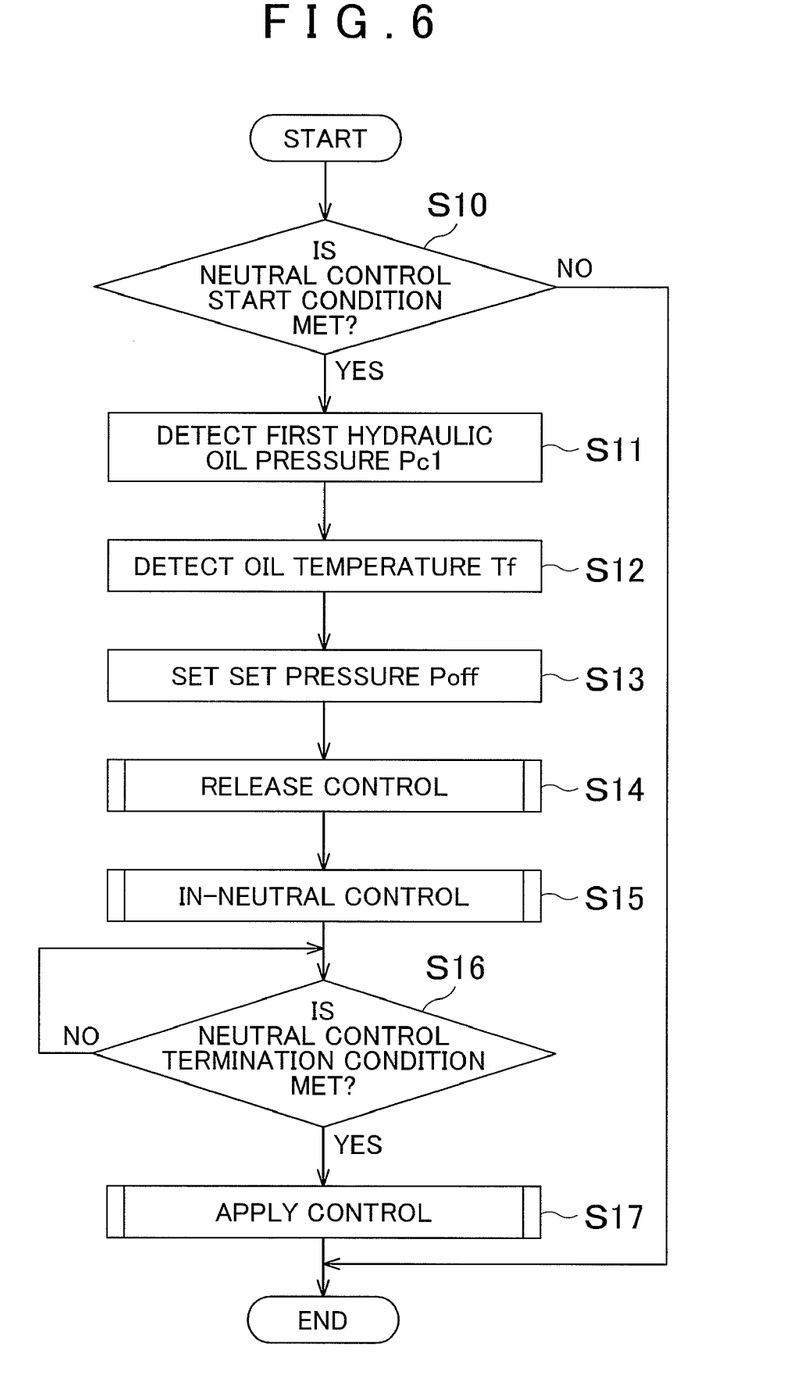
FIG. 6 is a flow chart illustrating a neutral control processing routine.

Referring back to the flow chart of FIG. 6, the ECU 50 performs the release control (step S14). Specifically, the ECU 50 reduces the first hydraulic oil pressure Pc1 supplied to the hydraulic servo C-1 by controlling the drive of the hydraulic control circuit 40 (linear solenoid valves 45, 46). In this embodiment, therefore, the ECU 50 functions as a controller. Note also that step S14 corresponds to a release step. Although a description is not given in the flow chart of FIG. 6, even during the release control, if a termination condition for the neutral control (described later) is met, the ECU 50 forcibly interrupts the release control, and proceeds to step S17 (described later).

Referring here to the timing chart of FIG. 8, in the running N control, when the release control is performed immediately after the first timing t11, an actual hydraulic oil pressure RPc1 in the hydraulic servo C-1 is reduced, following the reduction in the first hydraulic oil pressure Pc1. The reduction in the actual hydraulic oil pressure RPc1 then gradually weakens the engagement force of the first clutch C1 (specifically, the rotation transmission efficiency is reduced), so that the load applied to the input shaft 17 is gradually reduced. After a second timing t12 after the start of the release control, an input shaft speed Nc1 of the input shaft 17 detected by the ECU 50 based on the detection signal from the input shaft speed sensor SE2 gradually increases. Note that, in the neutral control, during which the accelerator pedal (not shown) is not depressed, the engine speed Ne of the engine 10 detected by the ECU 50 based on the detection signal from the engine speed sensor SE1 becomes constant.

Note also that the lower the first hydraulic oil pressure Pc1 supplied to the hydraulic servo C-1 at the start of the running N control, the lower the actual hydraulic oil pressure RPc1 at the first timing t11. In this case, the amount of hydraulic oil supplied to the hydraulic servo C-1 per unit time may be small, and thus, it is likely that the amount of hydraulic oil stored in the hydraulic control circuit 40 will be small. If the release control is performed to reduce the first hydraulic oil pressure Pc1 in such a state, the amount of reduction in pressure of the actual hydraulic oil pressure RPc1 per unit time is more than that when the first hydraulic oil pressure Pc1 detected at the first timing t11 is high. Consequently, immediately after the termination of the release control, the actual hydraulic oil pressure RPc1 is likely to be lower as the hydraulic oil pressure Pc1 detected at the first timing t11 is lower.

In the direct N control, on the other hand, referring to the timing chart shown in FIG. 9, the first hydraulic oil pressure Pc1 before the start of the neutral control, at which timing the range of the automatic transmission 11 has just changed from the parking range or the neutral range to the D range, is lower than that in the running N control (at the first timing t21). There is also an extremely big difference in oil pressure between the first hydraulic oil pressure Pc1 and the actual hydraulic oil pressure RPc1 at the first timing t21. If the release control is started to reduce the first hydraulic oil pressure Pc1 in this state, the actual hydraulic oil pressure RPc1 gradually approaches the first hydraulic oil pressure Pc1. In the direct N control, however, the release control is terminated before the actual hydraulic oil pressure RPc1 is regulated to the first hydraulic oil pressure Pc1. Specifically, at timing when the release control is terminated, the actual hydraulic oil pressure RPc1 is lower than the first hydraulic oil pressure Pc1. Note that the actual hydraulic oil pressure RPc1 at this time is such a pressure that brings the first clutch C1 into a released state, and therefore the input shaft speed Nc1 of the input shaft 17 hardly changes during the release control.

Referring back to the flow chart of FIG. 6, as the release control is terminated, the ECU 50 performs the in-neutral control (to be described in detail with reference to FIG. 7) for maintaining the rotation transmission efficiency via the first clutch C1 at a low level (step S15). In this embodiment, therefore, step S15 corresponds to an in-neutral step. The ECU 50 next determines whether or not the termination condition for the neutral control is met (step S16). That is, in step S16, it is determined if at least any one of the following conditions is not met: the range of the automatic transmission 11 is the D range based on the detection signal from the shift position sensor SE5, the brake switch SW1 is "ON", the vehicle speed is substantially "0 (zero) km/h", and the throttle opening of the accelerator pedal is "0 (zero)".

If the determination result is negative at step S16, the ECU 50 repeatedly performs determination processing of step S16 until an affirmative result is obtained at step S16 (that is, the first hydraulic oil pressure Pc1 is held constant based on the in-neutral control). If the determination result is affirmative at step S16, on the other hand, the ECU 50 determines that the driver of the vehicle is likely to start the vehicle and performs an apply control for increasing the rotation transmission efficiency via the first clutch C1 (step S17). When the apply control is thereafter completed, the ECU 50 terminates the neutral control processing routine.

That is, as shown in the timing charts of FIGS. 8 and 9, the first hydraulic oil pressure Pc1 is boosted all at once at seventh timings t17, t27 and thereafter increased gradually. As a result, the actual hydraulic oil pressure RPc1 is increased, so that the engagement force of the first clutch C1 increases. Then, the first hydraulic oil pressure Pc1 is held constant once the first clutch C1 is brought into the engaged state (eighth timings t18, t28).

An in-neutral control processing routine for executing the above-described in-neutral control (step S15) will next be described based on a flow chart shown in FIG. 7 and the timing charts shown in FIGS. 8 and 9.

When the in-neutral control processing routine is executed, the ECU 50 performs, for a predetermined period of time, check control processing for determining whether or not the rotation transmission efficiency via the first clutch C1 is in a predetermined state set previously as a low efficiency (step S20). The check control processing uses an action that the smaller the engagement force of the output side member relative to the input side member of the input clutch, the more the rotation transmission efficiency via the first clutch C1 is reduced, resulting in a smaller amount of fluctuation Nch in the input shaft speed Nc1 in accordance with the microscopic fluctuation in the first hydraulic oil pressure Pc1. Accordingly, it can be said that the smaller the amount of fluctuation Nch, the lower the rotation transmission efficiency via the first clutch C1.

That is, referring to the timing chart of FIG. 8, in the running N control, the first hydraulic oil pressure Pc1 is increased by a fluctuation oil pressure D1 and thereafter the first hydraulic oil pressure Pc1 is reduced by the fluctuation oil pressure D1 (at a third timing t13). Then, the actual hydraulic oil pressure RPc1 fluctuates microscopically with a slight time lag from such a microscopic fluctuation of the first hydraulic oil pressure Pc1, so that the input shaft speed Nc1 detected by the ECU 50 based on the detection signal from the input shaft speed sensor SE2 fluctuates, first dropping slightly and then increasing to the original speed (fourth timing t14). When the microscopic fluctuation of the first hydraulic oil pressure Pc1 within a predetermined pressure range (a range of the fluctuation oil pressure D1) as described above is intermittently executed a plurality of times (three times according to this embodiment), the check control processing is terminated (fifth timing t15).

In the direct N control, on the other hand, the actual hydraulic oil pressure RPc1 hardly fluctuates even when the first hydraulic oil pressure Pc1 is caused to fluctuate microscopically within the predetermined pressure range (the third timing t23), as shown in the timing chart of FIG. 9. Accordingly, the input shaft speed Nc1 hardly fluctuates even if the check control processing is performed. That is, with the direct N control, the amount of fluctuation Nch of the input shaft speed Nc1 is a value that is substantially close to "0 (zero)". The check control processing is then terminated when the microscopic fluctuation of the first hydraulic oil pressure Pc1 within the predetermined pressure range is intermittently executed a plurality of times (the fifth timing t25).

Note that, of the input side member and the output side member that constitute the first clutch C1, the input side member is connected to the input shaft 17. The input shaft speed Nc1 of the input shaft 17 is therefore equal to an input side speed of the first clutch C1. That is, in this embodiment, the input shaft speed Nc1 is detected as the input side speed of the first clutch C1. In this embodiment, therefore, the ECU 50 which detects the input shaft speed Nc1 based on the detection signal from the input shaft speed sensor SE2 functions also as a speed detection portion.

Figure 7:
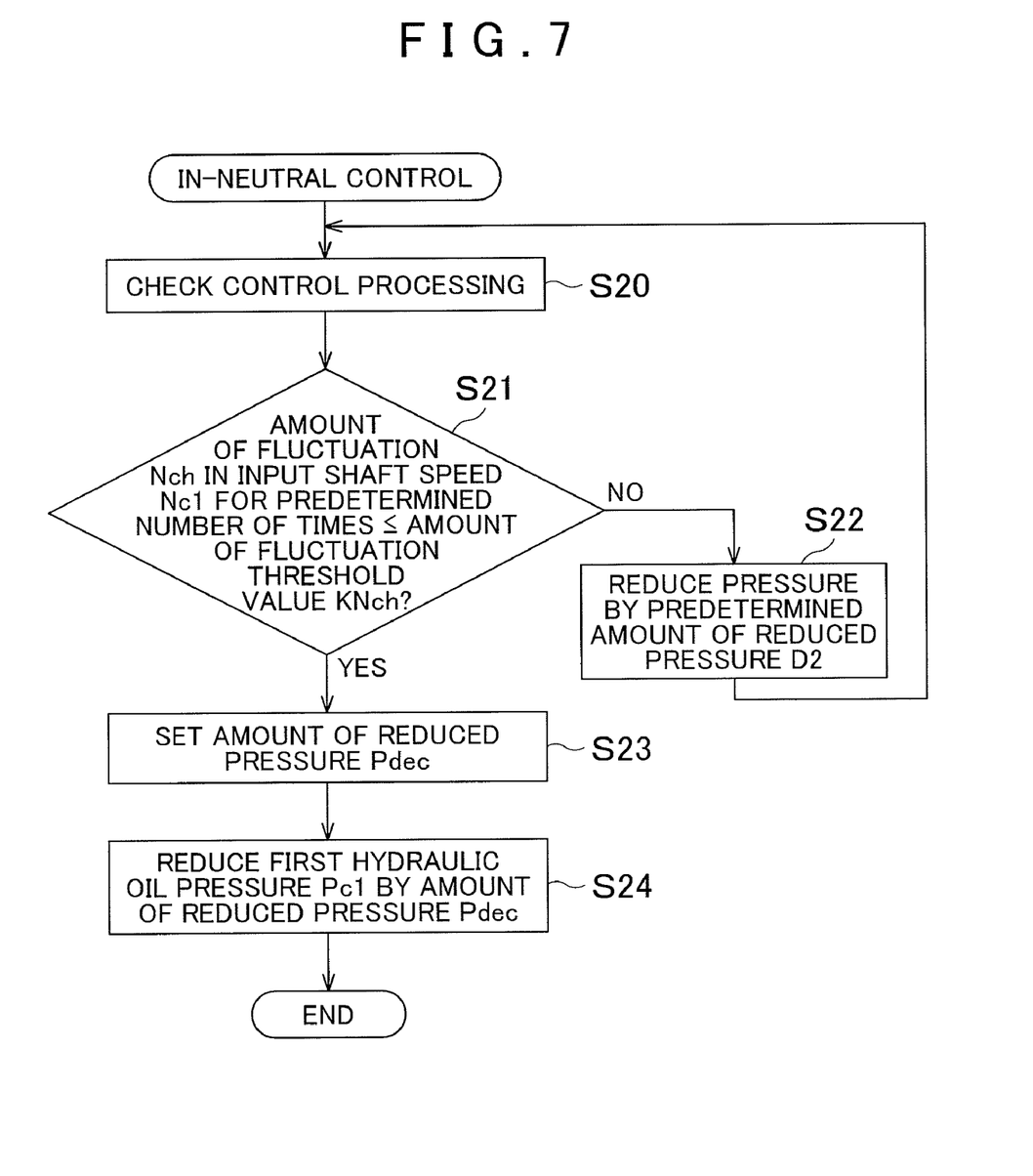
FIG. 7 is a flow chart illustrating an in-neutral control processing routine.

Referring back to the flow chart of FIG. 7, the ECU 50 determines whether or not all the amounts of fluctuation Nch detected for the predetermined number of times during the check control processing are equal to or less than an amount of fluctuation threshold value (speed threshold value) KNch (step S21). The amount of fluctuation threshold value KNch is a value for detecting a stroke near-end condition that is close to a so-called stroke-end condition, in which the engagement force of the output side member relative to the input side member of the first clutch C1 is substantially "0 (zero)", and is previously determined through, for example, experiments and simulation. Note that the first clutch C1 is in the stroke near-end condition when, in other words, "the rotation transmission efficiency via the first clutch C1 is in a predetermined condition".

If the determination result is negative (at least one Nch of those for the predetermined number of times>KNch) at step S21, the ECU 50 determines that the first clutch C1 is probably not in the stroke near-end condition, and drives the hydraulic control circuit 40 so as to reduce the first hydraulic oil pressure Pc1 by a predetermined amount of reduction in pressure D2 that is set to a value substantially equal to the fluctuation oil pressure D1 (step S22). The ECU 50 thereafter proceeds to the above-described step S20.

If, on the other hand, the determination result is affirmative (Nch for the predetermined number of times>KNch) at step S21, the ECU 50 determines that the first clutch C1 is in the stroke near-end condition, adds the set pressure Poff set in step S13 to the fluctuation oil pressure D1, and sets the added result in an amount of reduction in pressure Pdec (step S23). That is, immediately after the termination of the check control processing, the first hydraulic oil pressure Pc1 has been boosted by the fluctuation oil pressure D1. In step S23, therefore, the amount of reduction in pressure Pdec is set to a value that incorporates the fluctuation oil pressure D1. Then, the ECU 50 reduces the first hydraulic oil pressure Pc1 by the amount of reduction in pressure Pdec (step S24). The ECU 50 thereafter terminates the check control processing with the first hydraulic oil pressure Pc1 maintained. It is to be noted here that, if a termination condition for the neutral control is met, the ECU 50 terminates the check control processing and proceeds to the above-described step S17, though the foregoing is not described in the flow chart of FIG. 7.

That is, referring to the timing charts of FIGS. 8 and 9, the first hydraulic oil pressure Pc1 is reduced by the amount of reduction in pressure Pdec at the fifth timings t15, t25 relative to the level immediately after the termination of the check control processing. As a result, the first clutch C1 further approaches the stroke-end condition from the stroke near-end condition immediately after the termination of the check control processing. Then in the running N control, a speed difference N between the engine speed Ne detected by the ECU 50 based on the detection signal from the engine speed sensor SE1 and the input shaft speed Nc1 further decreases as shown in the timing chart of FIG. 8 (sixth timing t16). That is, rotation load of the input shaft 17 via the first clutch C1 further decreases.

Even in a case where the actual hydraulic oil pressure RPc1 is low at the fifth timing t15 as a result of a low first hydraulic oil pressure Pc1 at the first timing t11, the set pressure Poff is set low, which avoids the actual hydraulic oil pressure RPc1 becoming excessively low after the fifth timing t15. That is, when the input shaft speed Nc1 changes due to the check control processing (i.e., the first clutch C1 is in a so-called half-engaged state), the first clutch C1 is set to a condition that is even closer to the stroke-end condition regardless of the magnitude of the first hydraulic oil pressure Pc1 at the first timing t11.

In the direct N control, on the other hand, referring to the timing chart of FIG. 9, the first hydraulic oil pressure Pc1 and the actual hydraulic oil pressure RPc1 immediately before the start of the release control (at the first timing t21) are so low that there are very little fluctuations in the speed difference N even if the first hydraulic oil pressure Pc1 is reduced by the amount of reduction in pressure Pdec relative to the level immediately after the termination of the check control processing (at the sixth timing t26).

In this embodiment, therefore, the following advantages can be achieved:

(1) If the first clutch C1 is determined to be in the stroke near-end condition as a result of the check control (step S20), the first hydraulic oil pressure Pc1 supplied to the hydraulic servo C-1 is reduced by the amount of reduction in pressure Pdec from the first hydraulic oil pressure Pc1 immediately after the termination of the check control and is thereafter held constant. When the running N control is performed, therefore, the load on the input shaft 17 during the neutral control becomes smaller than that of the related-art configuration in which the first hydraulic oil pressure Pc1 is held at the first hydraulic oil pressure Pc1 at the termination of the check control. Consequently, performing the running N control allows the crankshaft 10a to rotate under a low load condition, which improves fuel efficiency of the vehicle.

(2) The check control detects the amount of fluctuation Nch of the input shaft speed Nc1 of the input shaft 17 (=the amount of fluctuation in the input side speed of the input side member of the first clutch C1) when the first hydraulic oil pressure Pc1 is caused to microscopically fluctuate within the predetermined pressure range (fluctuation oil pressure D1). If the detected amount of fluctuation Nch is equal to or less than the amount of fluctuation threshold value KNch, the first clutch C1 is determined to be in the stroke near-end condition. That is, the check control of this embodiment uses the action that the smaller the engagement force of the output side member relative to the input side member of the first clutch C1, the more the rotation transmission efficiency via the first clutch C1 is reduced, resulting in a smaller amount of fluctuation Nch in the input shaft speed Nc1 in accordance with the microscopic fluctuation in the first hydraulic oil pressure Pc1. Accordingly, the positional relationship between the input side member and the output side member of the first clutch C1 during the in-neutral control can be suitably adjusted.

(3) Generally, the hydraulic oil has a higher viscosity at lower oil temperatures Tf. That is, the lower the oil temperature Tf, the poorer the ability of the actual hydraulic oil pressure RPc1 in the hydraulic servo C-1 to follow the first hydraulic oil pressure Pc1, resulting in a slower speed of fluctuation of the actual hydraulic oil pressure RPc1 in response to a control command from, for example, the ECU 50. In this embodiment, therefore, the set pressure Poff is set to a smaller value at lower oil temperatures Tf. At timing immediately after the check control, therefore, a condition can be quickly created, in which the actual hydraulic oil pressure RPc1 is held at a predetermined pressure regardless of the oil temperature Tf. Alternatively, at the termination of the neutral control, the actual hydraulic oil pressure RPc1 can be quickly boosted to a pressure that brings the first clutch C1 into the engaged state regardless of the oil temperature Tf. This contributes to quick starts of the vehicle.

(4) Generally speaking, the lower the first hydraulic oil pressure Pc1 immediately before the running N control, the greater the difference in oil pressure between the actual hydraulic oil pressure RPc1 and the first hydraulic oil pressure Pc1. After the release control, therefore, a trend can be noted in which the lower the first hydraulic oil pressure Pc1 immediately before the neutral control, the greater the difference between the actual hydraulic oil pressure RPc1 and the first hydraulic oil pressure Pc1. In this embodiment, therefore, the set pressure Poff is set to a smaller value at lower first hydraulic oil pressures Pc1 immediately before the running N control. Accordingly, it is possible to inhibit the magnitude of the actual hydraulic oil pressure RPc1 when the first hydraulic oil pressure Pc1 is held constant by the in-neutral control from changing due to the magnitude of the actual hydraulic oil pressure RPc1 immediately before the running N control. Accordingly, it is possible to inhibit the efficiency in improving fuel consumption by the running N control from changing due to the magnitude of the first hydraulic oil pressure Pc1 immediately before the running N control. In addition, when the running N control is terminated, the actual hydraulic oil pressure RPc1 can be quickly boosted to a pressure level that brings the first clutch C1 into the engaged state regardless of the magnitude of the first hydraulic oil pressure Pc1 immediately before the running N control. That is, this contributes to quick starts of the vehicle.

Note that the embodiment may be modified to others as described below. In an embodiment, the set pressure Poff may not have to be set, if the direct N control is performed from, for example, the magnitude of the first hydraulic oil pressure Pc1 when the neutral control start conditions are met.

In an embodiment, the set pressure Poff may be set to a first oil pressure if the first hydraulic oil pressure Pc1 immediately before the start of the neutral control is lower than the first oil pressure threshold value KPc11, to a second oil pressure that is higher than the first oil pressure if the first hydraulic oil pressure Pc1 is equal to or higher than the first oil pressure threshold value KPc11 and lower than the third oil pressure threshold value KPc13, and to a third oil pressure that is higher than the second oil pressure if the first hydraulic oil pressure Pc1 is equal to or higher than the third oil pressure threshold value KPc13.

In an embodiment, the set pressure Poff may be set regardless of the oil temperature Tf of the hydraulic oil. Even with this configuration, the set pressure Poff is set to a smaller value at lower first hydraulic oil pressures Pc1 immediately before the start of the neutral control. In the apply control, therefore, the actual hydraulic oil pressure RPc1 can be quickly boosted to a pressure that brings the first clutch C1 into the engaged state regardless of the magnitude of the first hydraulic oil pressure Pc1 immediately before the start of the neutral control.

In an embodiment, the set pressure Poff may be set regardless of the first hydraulic oil pressure Pc1 immediately before the start of the neutral control. Even with this configuration, the set pressure Poff is set to an oil pressure according to the oil temperature Tf of the hydraulic oil. Therefore, it is possible to quickly create a condition in which the actual hydraulic oil pressure RPc1 is held constant when the first hydraulic oil pressure Pc1 is reduced by the set pressure Poff after the termination of the check control.

In an embodiment, the set pressure Poff may be a predetermined pressure set in advance. Even with configuration, advantages equivalent to (1) and (2) described above can be obtained.

In an embodiment, the first hydraulic oil pressure Pc1 may be microscopically changed any number of times in the check control. Preferably, the first hydraulic oil pressure Pc1 is microscopically changed a plurality of times, because false determination could result from a microscopic change of the first hydraulic oil pressure Pc1 made only once.

In an embodiment, the first hydraulic oil pressure Pc1 may be reduced by the set pressure Poff (more specifically, the amount of reduction in pressure Pdec) after the termination of the check control so as to bring the first clutch C1 into a completely released state. In this case, the set pressure Poff is set to a pressure higher than that in the above embodiment. Through this control configuration, it is possible to further improve the fuel efficiency improvement effect of the vehicle based on the execution of the neutral control. Moreover, the positional relationship of the output side member relative to the input side member of the first clutch C1 is clarified by performing the check control. Therefore, compared with the case in which the first hydraulic oil pressure Pc1 is reduced appropriately, it is possible to inhibit the occurrence of an error in the time until the first clutch C1 is brought into the engaged state through the apply control.

In an embodiment, the first clutch C1 may be engaged or disengaged by a control to regulate the pressure of fluid other than the hydraulic oil (e.g. gas).

In an embodiment, the automatic transmission 11 may be embodied in an automatic transmission of another type (e.g. an automatic transmission having four forward speeds and one reverse). Alternatively, the automatic transmission 11 may be embodied in a continuously variable transmission that includes a belt in the speed change mechanism.

In an embodiment, the automatic transmission 11 may be mounted on an electric vehicle or a hybrid vehicle. In this case, a motor that serves as a drive source for the electric vehicle or the hybrid vehicle functions as a prime mover.

What is claimed is:

1. A control apparatus for an automatic transmission having a rotation transmission mechanism for transmitting rotation of a prime mover mounted on a vehicle to a speed change mechanism and an input clutch for controlling connection and disconnection of the rotation transmitted from the rotation transmission mechanism, the control apparatus comprising:
 a control portion that performs a neutral control including a release control that reduces a fluid pressure relative to the input clutch so as to reduce rotation transmission efficiency from the rotation transmission mechanism side to the speed change mechanism side via the input clutch when the vehicle is stationary, and an in-neutral control that adjusts the fluid pressure relative to the input clutch so as to maintain the rotation transmission efficiency via the input clutch at a low efficiency, wherein
 the control portion performs, during the in-neutral control, a check control that makes the fluid pressure relative to the input clutch fluctuate and, when determining as a result of the check control, that the rotation transmission efficiency via the input clutch is in a predetermined state set previously as a low efficiency, reduces the fluid pressure relative to the input clutch at termination of the check control by a set pressure and thereafter keeps the fluid pressure constant.

2. The control apparatus according to claim 1, further comprising:
 a speed detection portion that detects an input side speed of the input clutch, wherein
 the control portion makes, in the check control, the fluid pressure relative to the input clutch fluctuate within a predetermined pressure range that is previously set and, when an amount of fluctuation of the input side speed of the input clutch detected by the speed detection portion during the check control is equal to or less than a previously set speed threshold value, determines that the rotation transmission efficiency via the input clutch is in the predetermined state.

3. The control apparatus according to claim 1, further comprising:
 a temperature detection portion that detects a temperature of a fluid for generating a fluid pressure relative to the input clutch; and
 a first setting portion that sets a smaller value for the set pressure at a lower temperature of the fluid detected by the temperature detection portion, wherein
 during the in-neutral control, when determining as a result of the check control, that the rotation transmission efficiency via the input clutch is in the predetermined state, the control portion reduces the fluid pressure relative to the input clutch at the termination of the check control by the set pressure set by the first setting portion, and thereafter keeps the fluid pressure constant.

4. The control apparatus according to claim 1, further comprising:
 a fluid pressure detection portion that detects the fluid pressure relative to the input clutch; and
 a second setting portion that sets a smaller value for the set pressure at a lower fluid pressure detected by the fluid pressure detection portion before the release control, wherein
 during the in-neutral control, when determining as a result of the check control, that the rotation transmission efficiency via the input clutch is in the predetermined state, the control portion reduces the fluid pressure relative to the input clutch at the termination of the check control by the set pressure set by the second setting portion and thereafter keeps the fluid pressure constant.

5. A control method for an automatic transmission having a rotation transmission mechanism for transmitting rotation of a prime mover mounted on a vehicle to a speed change mechanism and an input clutch for controlling connection and disconnection of the rotation transmitted from the rotation transmission mechanism, the control method comprising:
 a release step of reducing a fluid pressure relative to the input clutch such that rotation transmission efficiency via the input clutch is reduced, when a start condition is met for a neutral control that reduces the rotation transmission efficiency from the rotation transmission mechanism side to the speed change mechanism side via the input clutch as compared with the efficiency during vehicle running while the vehicle is stationary; and
 an in-neutral step of maintaining the rotation transmission efficiency via the input clutch low after the release step, wherein the in-neutral step includes:
 performing a check control that causes the fluid pressure relative to the input clutch to fluctuate;
 reducing, when it is determined, as a result of the check control, that the rotation transmission efficiency via the input clutch is in a predetermined state set previously as a low efficiency, the fluid pressure relative to the input clutch at the termination of the check control by a set pressure; and
 keeping, after the reduction in the fluid pressure, the fluid pressure relative to the input clutch constant.

* * * * *